Dec. 14, 1926.                                                            1,610,463
G. E. MIRFIELD ET AL
PIPE CUTTING-OFF AND ROUNDING MACHINE
Filed April 22, 1922        10 Sheets-Sheet 3
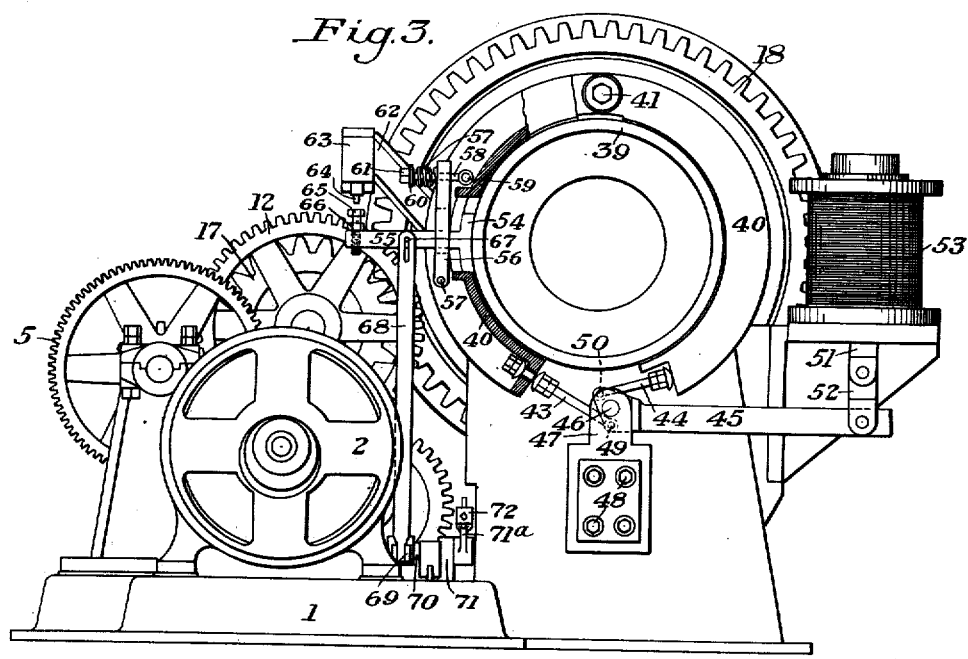
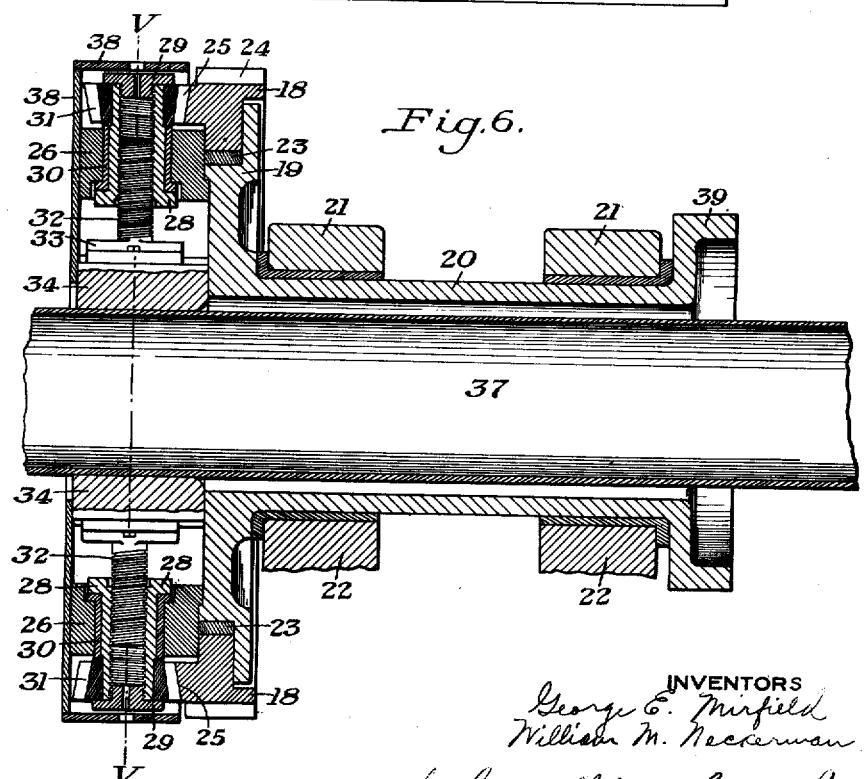
INVENTORS
George E. Mirfield
William M. Neckerman
by Byrnes, Stebbins, Burger & Parmelee
their Attorneys

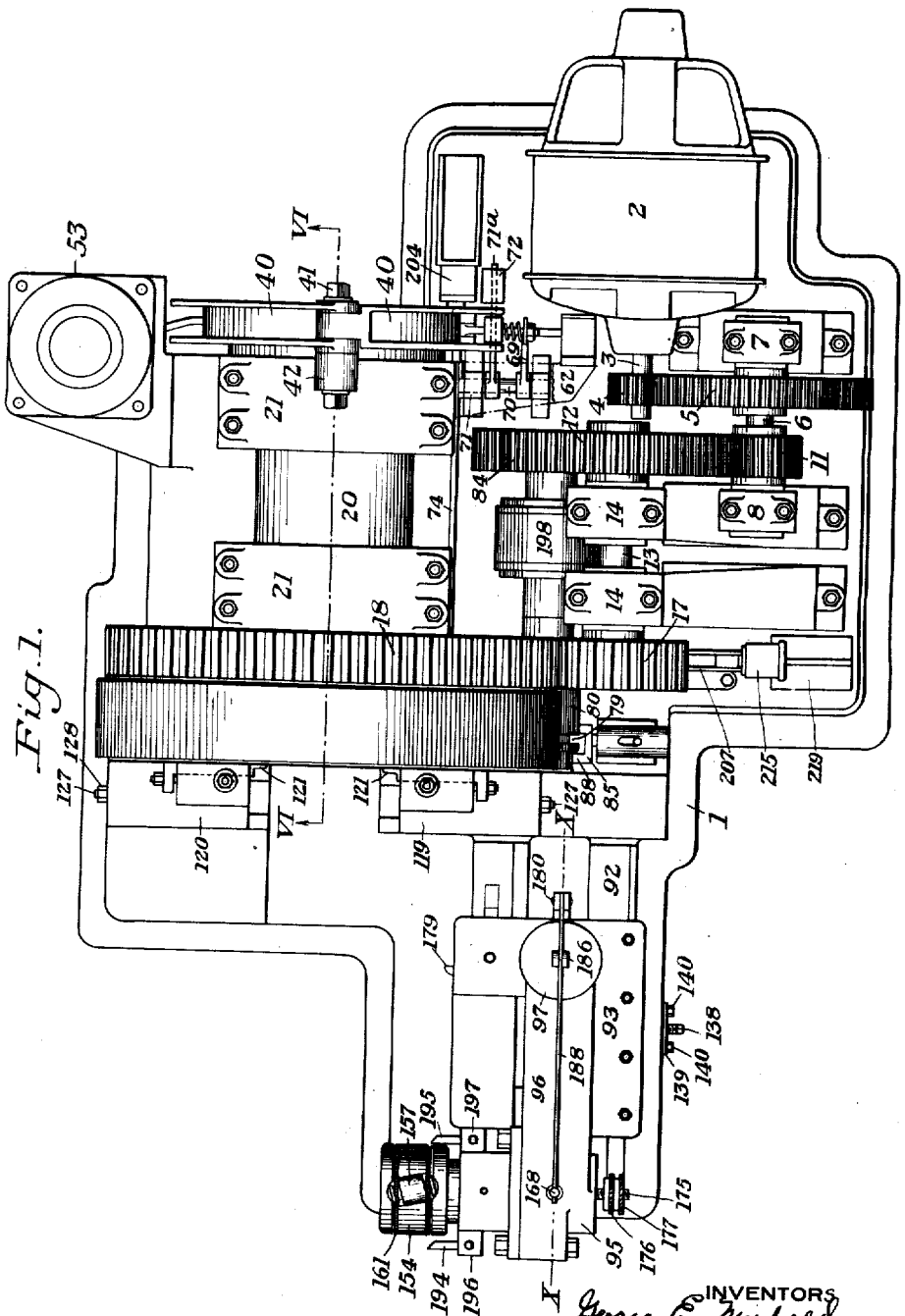

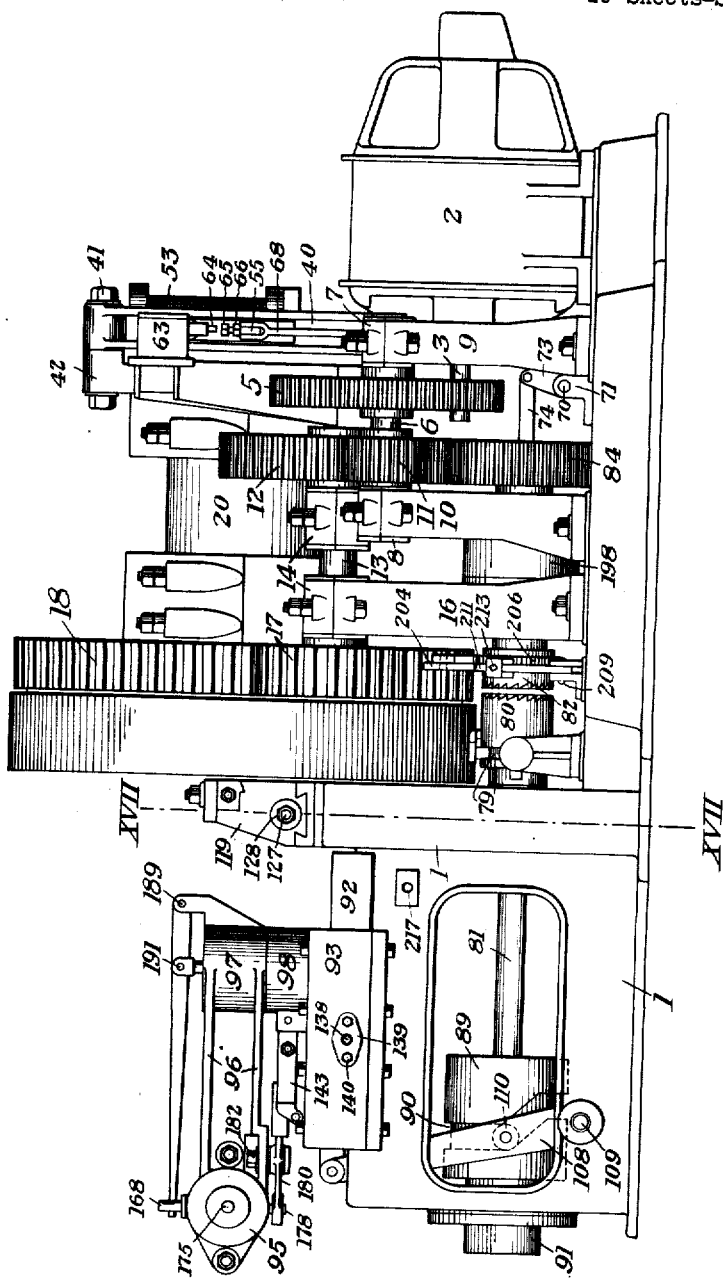

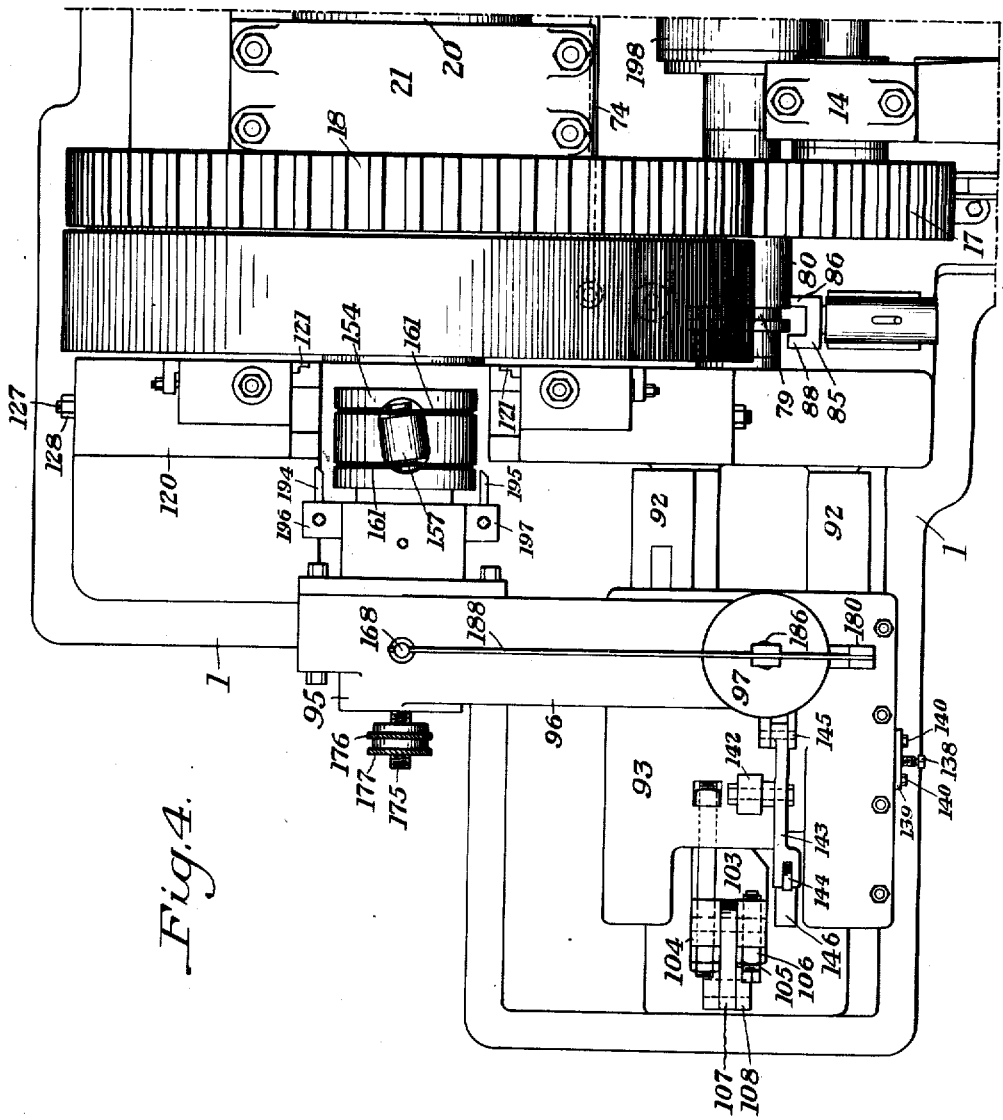

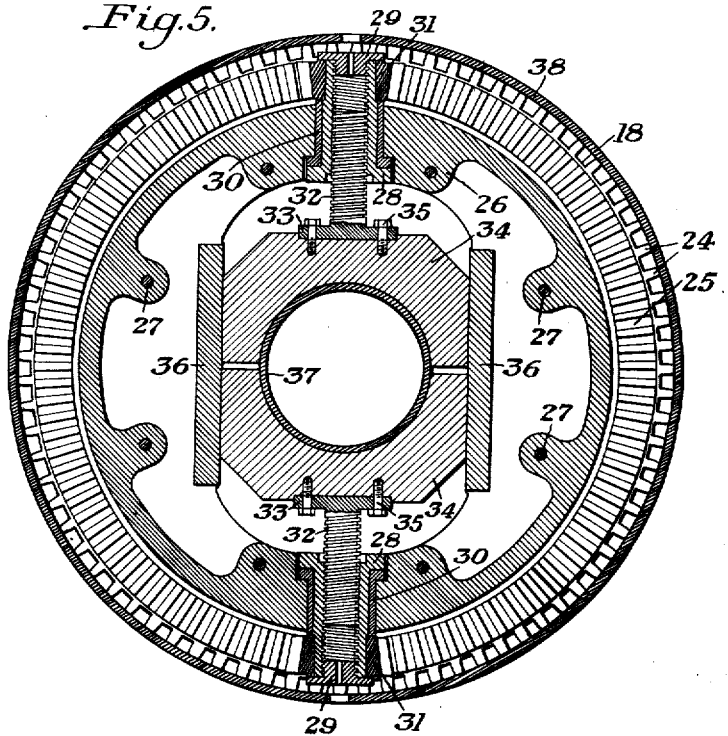
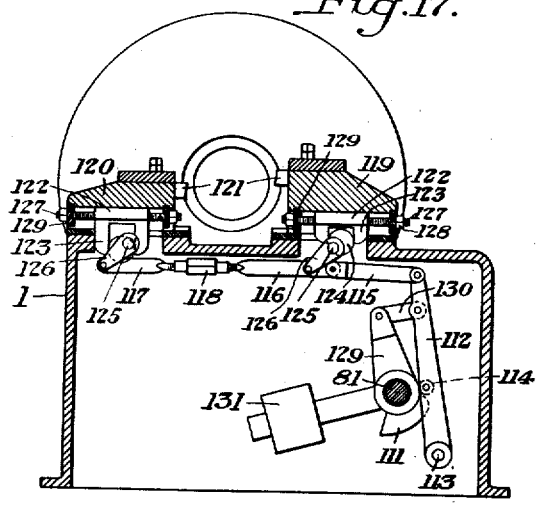

Dec. 14, 1926.
G. E. MIRFIELD ET AL
1,610,463
PIPE CUTTING-OFF AND ROUNDING MACHINE
Filed April 22, 1922    10 Sheets-Sheet 6
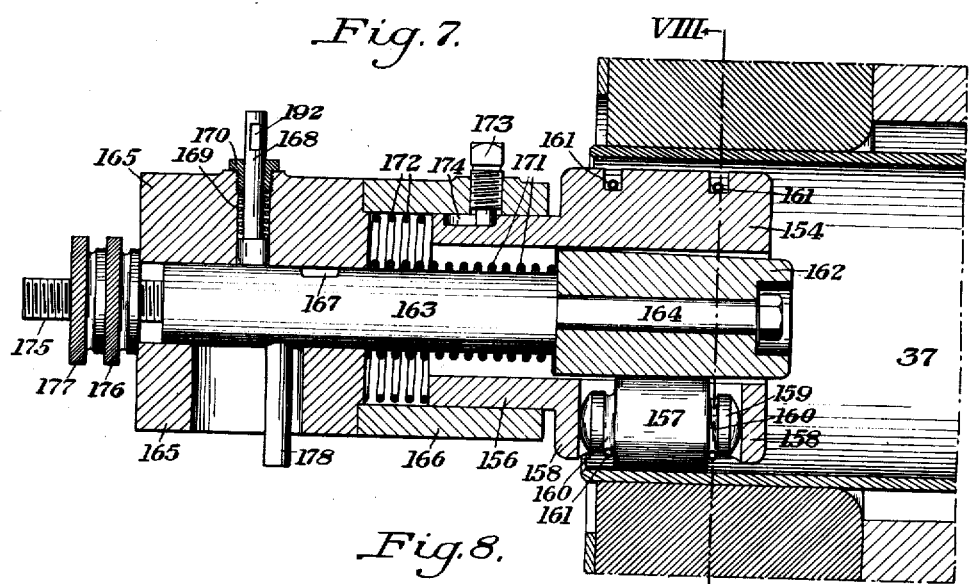
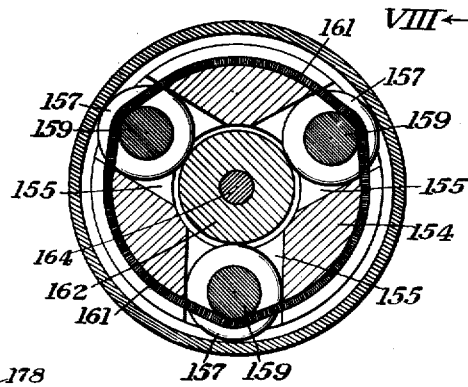
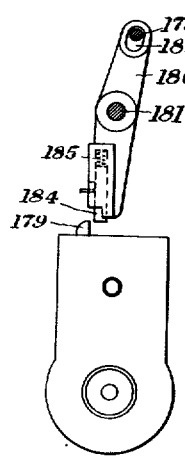
INVENTORS
George E. Mirfield
William M. Neuerman
by Byrnes, Stebbins, Burgess & Lunvolin
their Attorneys

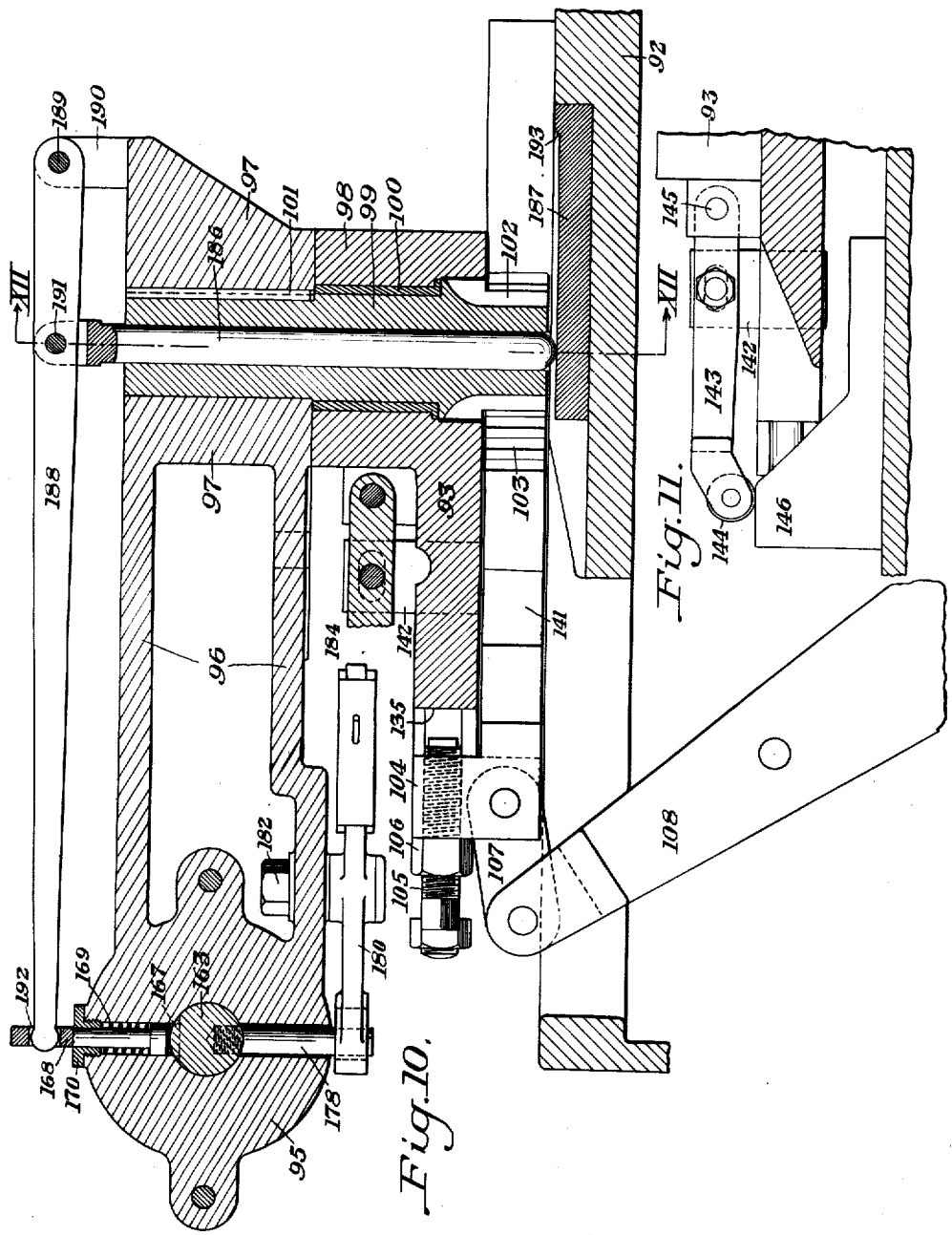

Dec. 14, 1926.
G. E. MIRFIELD ET AL
1,610,463
PIPE CUTTING-OFF AND ROUNDING MACHINE
Filed April 22, 1922    10 Sheets-Sheet 8

INVENTORS
George E. Mirfield
William M. Neverman
by Byrnes, Stebbins, Burges & Permele
their Attorneys Dec. 14, 1926.                                                    1,610,463
G. E. MIRFIELD ET AL
PIPE CUTTING-OFF AND ROUNDING MACHINE
Filed April 22, 1922        10 Sheets-Sheet 9
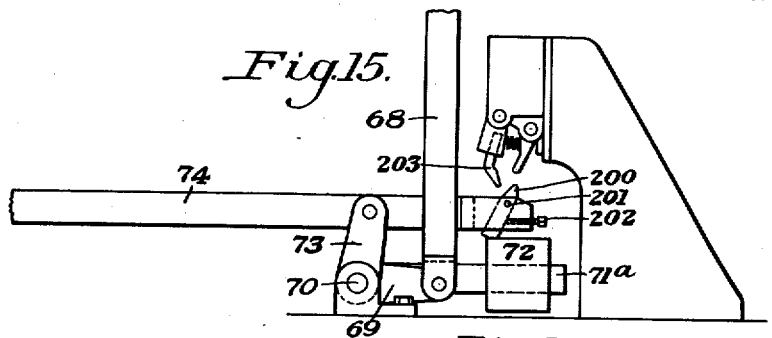
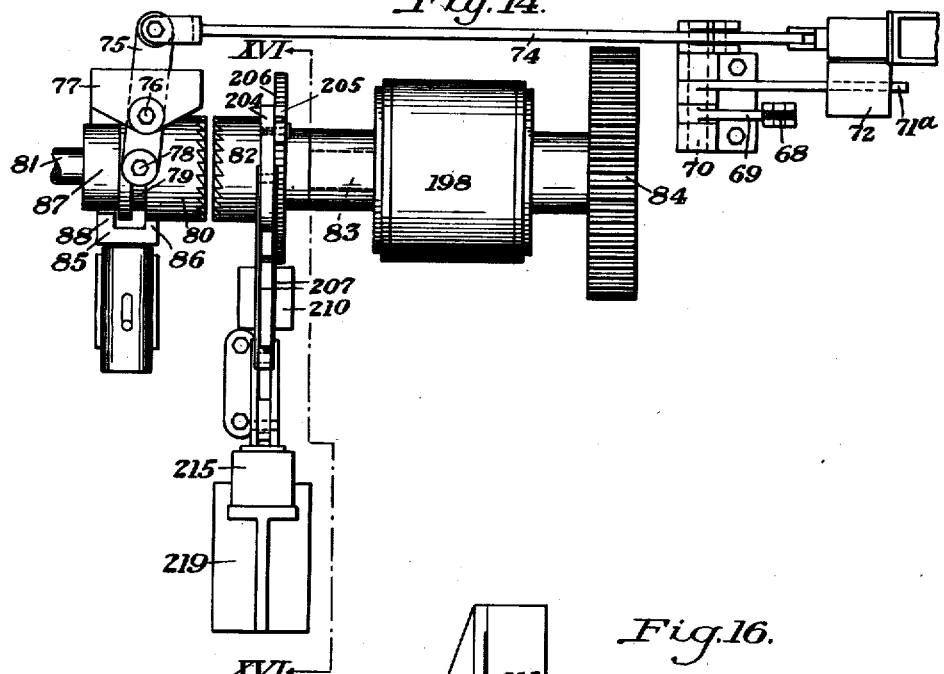
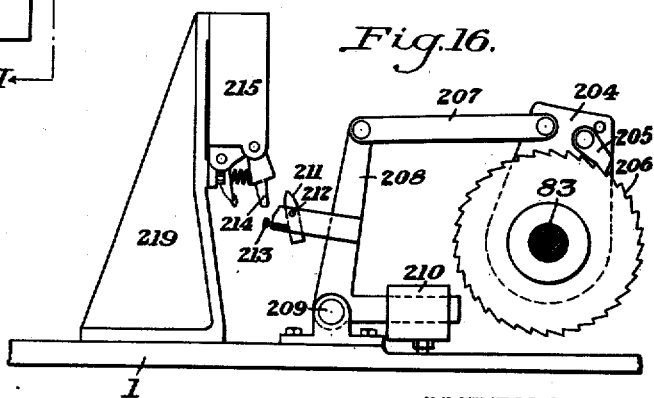
INVENTORS
George E. Mirfield
William M. Neearman
by their Attorneys Dec. 14, 1926. 1,610,463
G. E. MIRFIELD ET AL
PIPE CUTTING-OFF AND ROUNDING MACHINE
Filed April 22, 1922 10 Sheets-Sheet 10
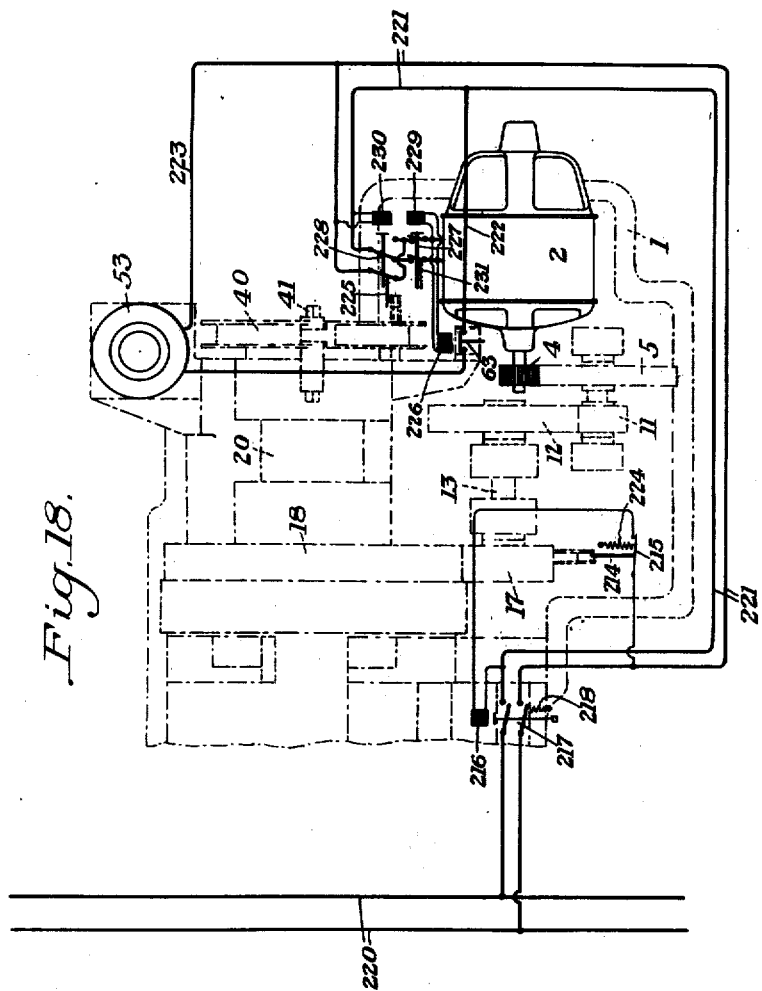

Patented Dec. 14, 1926.

1,610,463

UNITED STATES PATENT OFFICE.

GEORGE E. MIRFIELD AND WILLIAM M. NECKERMAN, OF YOUNGSTOWN, OHIO.

PIPE CUTTING-OFF AND ROUNDING MACHINE.

Application filed April 22, 1922. Serial No. 555,972.

Our invention relates to pipe machines and particularly to such machines for cutting off, rounding and chamfering the pipe. In a machine embodying our invention the only manual operations required are those of placing the pipe in the machine and removing the same from the machine after the desired operations have been completed. On account of the automatic features of the machine wherein the pipe is clamped, cut off, rounded and chamfered and unclamped in succession and without manual manipulation, a great saving in labor and a substantial increase in the amount of material handled are effected, thus considerably decreasing the cost.

Our invention will be better understood by reading the following description taken in connection with the accompanying drawings forming a part thereof, and in which:

Figure 1 is a plan view of a machine embodying our invention;

Figure 2 is a side elevation of the machine;

Figure 3 is an end elevation of the machine;

Figure 4 is a plan view of a portion of the machine, showing the head rotated 90° from the position shown in Fig. 1.

Figure 5 is a section on line V—V of Figure 6;

Figure 6 is a section on line VI—VI of Figure 1, with the brake and its operating mechanism omitted;

Figure 7 is a longitudinal section through the expanding mandrel, and including a portion of the clamping means showing the same inside the pipe;

Figure 8 is a section on line VIII—VIII of Figure 7 with the pipe and the clamping means omitted;

Figure 9 is a fragmentary view of the resetting device;

Figure 10 is a section on line X—X of Figure 1;

Figure 11 shows a detail of the locking means between the rack bar and head;

Figure 14 is a fragmentary view showing the clutch operating mechanism;

Figure 15 shows a portion of the reversing switch mechanism in elevation;

Figure 16 shows the mechanism for disconnecting the motor at the end of the cycle;

Figure 17 is a partial section on line XVII—XVII of Figure 2, showing the cutting tools and means for holding and adjusting the same; and Figure 18 is a view showing diagrammatically the electrical circuits and the means for controlling the same.

Figure 12:
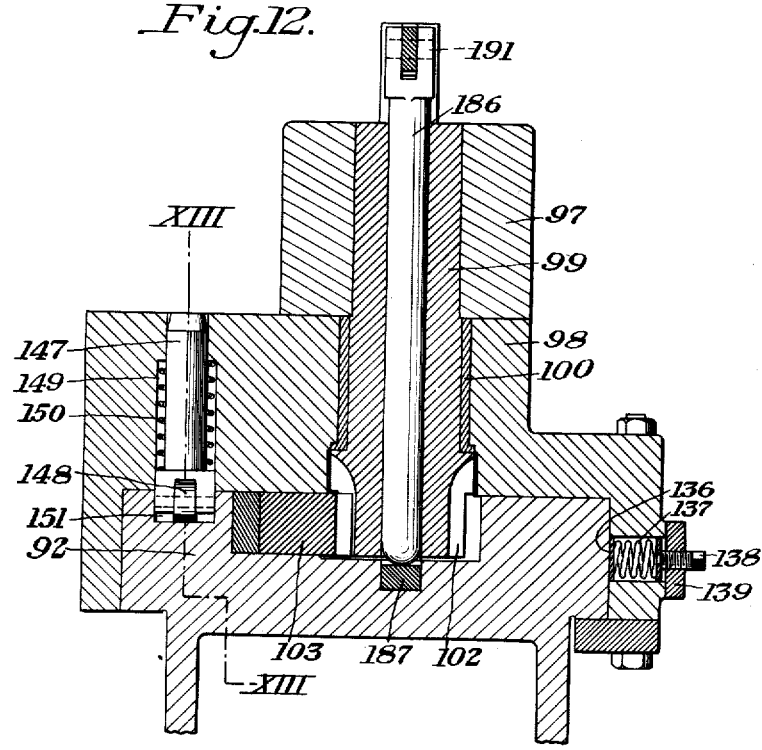
Figure 12 is a section on line XII—XII of Figure 10.

In describing the machine and its operation, the description will be divided into four parts in order that the same may be better understood. The parts into which the description will be divided are first, clamping the pipe; second, cutting off the pipe; third, rounding and chamfering; and fourth, unclamping the pipe.

The parts of the machine are mounted upon a base 1 of the desired size and configuration. Mounted on the base 1 is an electric or other motor 2. The motor is provided with a shaft 3 upon which is secured a pinion 4. The pinion 4 meshes with the gear 5 carried on the shaft 6 and mounted in bearings 7 and 8 and supported by bearing blocks 9 and 10 suitably fastened to the base 1. The shaft 6 carries the pinion 11 which meshes with the gear 12 mounted on a shaft 13, which is carried in bearings 14 supported by bearing blocks 16 suitably fastened to the base 1. The shaft 13 carries a pinion 17 which meshes with the gear 18, which is rotatably mounted on a flange 19 of the pipe receiving drum or barrel 20. The drum 20 is mounted in bearings 21 carried by bearing blocks 22, suitably supported by and attached to the base 1. The gear 18 is mounted on a flange 19 on the outside of a ring 23 attached to the flange 19. The gear 18 is provided on its periphery with teeth 24 and on the face with beveled teeth 25, as shown in Figures 5 and 6. Attached to the flange 19 of the drum 20 is a supporting member 26. The supporting member 26 is attached to the flange 19 by bolts 27 shown in section in Figure 5. Rotatably mounted in the member 26 are two sleeves 28 best shown in Figures 5 and 6. These sleeves are provided internally with screw threads and a lock nut 29 having a flange on the end thereof is screwed into the end of the sleeves 28 for the purpose of holding the sleeves in position. The sleeves are provided with flanges corresponding in function to the flanges on the lock nuts 29.

A bushing 30 of bearing material surrounds the sleeves 28 so that the sleeves 28 are mounted in the member 26 in the bushings 30 which act as bearings. Mounted on the sleeves 28 are beveled pinions 31 which mesh with the teeth 25 on the gear 18. Mounted inside of the sleeves 28 are screw members 32 having threads thereon fitting into the threads on the inside of the sleeves 28. The members 32 have flanges 33 thereon which are attached to clamping jaws 34 by means of bolts 35. The clamping jaws 34 move in a radial direction and are guided in their movements by guides 36, which guides are attached to the supporting member 26. Each of the clamping jaws 34 is provided with a semi-cylindrical cut-away portion adapted to fit the exterior of a pipe 37, as shown in Figures 5 and 6. The arrangement of the parts described is such that upon a relative movement between the gear 18 and drum 20 the pinions 31 will be rotated and the clamping jaws moved inwardly or outwardly depending upon the direction of this relative movement. This movement of the clamping jaws effects a clamping or an unclamping of the pipe.

A casing 38 is placed around the clamping device as shown in Figures 5 and 6. This casing has a central opening to permit the passage of the pipe therethrough, as shown in Figure 6.

The drum or barrel 20 is provided at its end opposite the clamping jaws with a flange 39 which acts as a brake drum. Surrounding the brake drum 39 is a brake shoe 40, as shown in Figure 3. This shoe is divided into two substantially equal parts, each of which is pivotally carried by the bolt 41, which is supported by a projection 42 on top of one of the bearings 21 of the drum 20. The parts 40 of the brake band are connected at their other ends through connectors 43 and 44 with a lever 45 which is pivoted at 46 to a support 47, which is secured to the base of the machine by bolts 48. The connectors 43 and 44 are pivotally connected to lever 45 at the points 49 and 50, which are substantially equidistant from the pivotal point 46. Connected to the other end of the lever 45 is an operating solenoid core 51. The core 51 is connected to the lever 45 through a link 52. The solenoid core 51 is actuated in its upward direction by a coil 53. When released the weight of the core and the lever 45 acts to release the brake shoes from the brake drum. One of the brake shoes 40 has an opening cut therein and through which is introduced a friction shoe 54 which bears directly against the brake drum 39. The opening is somewhat longer circumferentially than the shoe 54 for a purpose which will appear later. The shoe 54 has an extension 55 which extends outward radially through the opening in the brake shoe and this extension 55 is provided with shoulders against which the member 56 rests. The member 56 is pivotally connected at 57 with the brake shoe and extends upwardly as shown in Figure 3, and is provided with a slot through which the extension 55 passes. A coiled spring 57 bears against one face of the member 56 and acts to hold the shoe 54 against the brake drum. The spring 57 surrounds a rod 58 which passes through the member 56 and is pivoted at 59 to the brake shoe. One end of the spring bears against the face of the member 56 and the other end bears against a collar 60 held in place on the rod 58 by a nut 61. By screwing the nut in one direction or the other, the compression of the spring 57 may be changed so as to change the friction of the shoe 54 against the brake drum.

A bracket 62 is mounted on the frame of the machine which carries a switch mechanism 63 which controls the circuit through the solenoid 53. The operating member 64 of the switch mechanism 63 extends downwardly, as shown in Figure 3. The extension 55 carries an adjustable bolt 65 which is screwed into the extension 55 and held in position by a lock nut 66. The bolt 65 is adapted to engage the member 64 and actuate the switch mechanism to open the circuit of the coil 53 for a purpose which will appear hereinafter.

The extension 55 is provided with a pin 67 which enters into an elongated slot in a link member 68. The member 68 is connected at its other end to a lever 69 which is rigidly connected to a shaft 70. The shaft 70 is carried in bearings 71 which are supported by the base 1, as shown in Figure 2. The shaft 70 carries an arm 71ª, upon which is placed a counterweight 72, shown in Figures 1 and 15. The shaft 70 also carries a lever 73 which is pivotally connected to a link 74, as shown in Figure 2. The link 74 extends parallel with the barrel 20, as shown in Figure 1, and connects at its other end with a lever 75, as shown in detail in Figure 14. The lever 75 is pivoted at 76 to a member 77, which is attached to the base 1. The other end of the lever 75 is provided with a pin 78, which works in an annular slot 79 in a clutch member 80, which rotates with the shaft 81, but may be freely moved longitudinally of the shaft 81 into and out of engagement with a corresponding clutch member 82, rigidly mounted on a shaft 83, carrying a gear 84 which meshes with the gear 12, as shown in Figure 1. As soon as the clutch members 80 and 82 have been engaged the brake coil 53 is deenergized and the brakes are released. The circuit of the coil 53 is held open by the coil 226 as long as the motor speed is sufficient to energize the coil to hold up the switch member 63.

A spring actuated member 85 is placed near the clutch member 80 and has a projection 86 adapted to enter the annular slot 79 when the clutch member 80 has been moved into engagement with the member 82. The projection 86 acts to hold the clutch members in engagement. The member 80 is provided with a cam 87 against which a projection 88 on the member 85 rests when the projection 86 is in the slot 79. The cam 87 is so arranged that at a predetermined point in the rotation of the clutch member 80, the projection 86 will be removed from the slot 79 so that the clutch member 80 may be moved out of engagement with the clutch member 82, as will be explained later. The shaft 81 is provided with a cylindrical member 89, which has a cam groove 90 cut in the circumference thereof, as shown in Figure 2. One end of the shaft 81 is journalled at 91 in the base 1 of the machine. The other end is carried in a bearing supported by the base 1.

The base 1 is provided with guide-ways 92, as shown in Figures 2 and 4. A carriage 93 is mounted upon the guide-ways 92 and carries a head 95. This head is carried by arms 96 which are attached to a hub 97, pivotally mounted on a cylindrical portion 98 of the carriage 93. The parts just described are shown in detail in Figure 10.

Extending through the cylindrical portion 98 of the carriage is a shaft 99. The shaft 99 is mounted in the portion 98 of the carriage in a sleeve 100 of bearing material and the said shaft is therefore free to rotate in the portion 98. The shaft 99 is provided with a key-way which registers with a corresponding key-way in the hub 97 and upon the placing of the key 101 in position as shown in Figure 10, the hub 97 is fixed to the shaft 99, so that it rotates therewith.

The shaft 99 is provided at its lower end with a pinion 102. This pinion meshes with a rack 103. The rack 103 has an upturned end portion 104 into which is screwed an adjusting screw 105 held in adjusted position by lock nut 106. Connected to the rack 103 is a link 107 which connects with a lever 108 pivoted to the base 1 at 109. This lever is provided with a pin carrying an anti-friction roller 110, which roller runs in the cam groove 90 in the member 89, as shown in Figure 2.

The parts so far described are the connections through which the rounding and chamfering operations are effected.

The next operation after the pipe has been clamped is that of cutting off the pipe. This is accomplished by the arrangement shown in detail in Figure 17. This device comprises a cam 111 which is fixed to the shaft 81 and rotated therewith. A lever 112 is pivoted at 113 and carries an anti-friction roller 114, which engages with the cam 111. The lever 112 is connected at its other end to the link 115. This link is connected to members 116 and 117, which are connected together by a turn buckle 118. Tool holders 119 and 120 are mounted on the base 1 of the machine on guideways of any suitable construction. The holders 119 are adapted to receive the tools 121 for cutting off the pipe. The tool holders are each provided with downwardly extending projections 122 which are provided with projections 123 adapted to be engaged by an eccentric 124. The eccentrics 124 are mounted on shafts 125, which shafts also carry arms 126 pivotally connecting with the members 116 and 117. The members 122 are carried by bolts 127 which are provided throughout their length with threads. These bolts are held against rotation normally by nuts 128. The bolts pass through supporting members 129 and thus act to support the members 122. By loosening one of the nuts 128 and rotating the bolts 127, the position of the members 122 with respect to each other may be changed, and also by this arrangement the tool holders 119 and 120 may be adjusted to accommodate the machine for different sizes of pipe.

A relative adjustment of the position of the tool holders may be accomplished by the turn buckle 118.

Mounted loosely upon the shaft 81 is a bell crank lever 129. One end of this lever connects with the lever 112 through a link 130. The other end is provided with a counterweight 131.

In the operation of the device the rotation of the cam 111 rotates the lever 112 in a clockwise direction, as viewed in Figure 17. This causes the shafts 125 to rotate in a counterclockwise direction. This action through the eccentrics 134 causes the tools 121 to approach each other, thus cutting off the pipe which is rotating. As soon as the cam 111 has passed the roller 114, the counterweight acts upon the lever 112 to move the same in a counterclockwise direction and has the effect of separating the tools from the pipe and returning them to their original position.

We will now describe the operation of rounding and chamfering the end of the pipe.

As heretofore stated, the head 95, Figures 1, 2, 4 and 10, is rotatably mounted on the carriage 93. This head is normally in the position shown in Figures 1 and 2, that is to say, out of line with the pipe being operated upon. When the shaft 81 carrying the cylindrical member 89 has rotated to the proper point, the cam groove 90 so acts upon the lever 108 as to move the same around its pivot 109 in a clockwise direction. This movement is transmitted through the link 107 to the rack 103. The rack moves to the right, as shown in Figure 10, until the end of the pin 105, strikes the carriage 93 at the point 135. The carriage 93 during this movement of the rack is held by the friction of a member 136 against the side of the guides 94. As illustrated in Figure 12, this friction is regulated by a spring 137 held under compression by a screw 138 screwed into a plate 139 attached to the carriage by bolts 140, as shown in Figures 1 and 2. During this movement of the rack the pinion 102 is rotated sufficiently to rotate the shaft 99 and the head 95 carried thereby through substantially 90° to the position shown in Figure 4.

After the pin 105 engages the carriage the further movement of the arm 108 will move the carriage along the guides 92 so that the head 95 will be moved into the end of the pipe. The rack 103 is provided with a slot 141 which is brought into alignment with a similar slot in the carriage 93 and in which a locking bolt 142 normally rests. This bolt, as shown in Figure 11, is pivotally connected to a lever 143, provided with a roller 144 at one end and pivoted at the other end at 145 to the carriage 93. The roller 144 is adapted to roll upon the cam 146 attached to the frame of the machine. After the carriage has moved to the right a sufficient distance for the roller to run down the face of the cam 146, the bolt 142 will pass into the slot 141 in the rack and lock the carriage to the rack.

Figure 13:
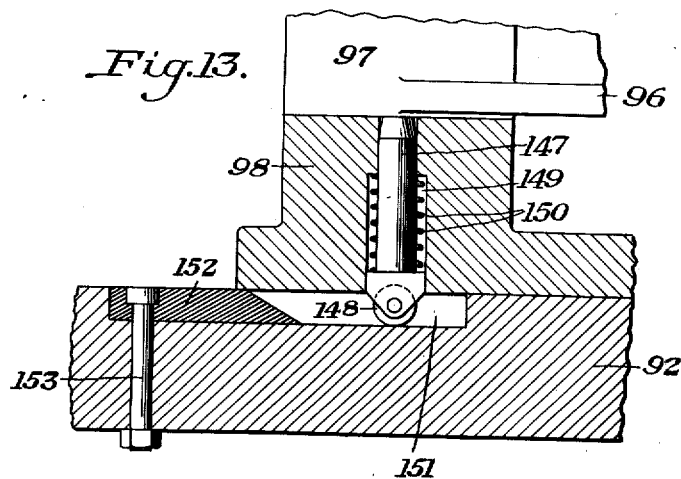
Figure 13 is a section on line XIII—XIII of Figure 12.

The portion 98 of the carriage carries a pin 147 which has a roller 148 mounted on the lower end thereof, as shown in Figures 12 and 13. The pin is mounted in a recess 149 in the portion 98 and is surrounded by a spring 150 which normally holds the pin in the position shown in Figures 12 and 13. One of the guides 92 is cut away at 151 and a tapered member 152 is fastened thereto by a counter-sunk bolt 153. The member 152 constitutes a cam surface in the path of the roller 148. The hub 97 which is mounted on the shaft 99 is provided with an opening to receive the pin 147. This opening is so positioned with respect to the pin as to register with the opening in which the pin is placed when the head has been rotated to the position shown in Figure 4. As soon as the carriage has moved on the guides a distance sufficient for the roller 148 to run up the cam 152, the pin 147 will enter the opening in the drum 97 and lock the drum 97 and the portion 98 together. By this arrangement the intermeshing teeth on the rack 103 and the gear 102 are relieved of the strain incidental to the rounding and chamfering operation of the pipe.

As the shaft 81 continues to rotate as above described, the head is placed in line with the pipe and the carriage is then moved to the right and the end of the head enters the pipe.

The head 95 is shown in detail in Figures 7 and 8. This head comprises a cylindrical body 154 which is provided with a central bore and three radial openings 155 leading from the central bore to the circumference of the body 154. The body 154 also has a reduced portion 156, as shown in Figure 7. Placed in the openings 155 are rollers 157, the ends of the rollers abutting against heads 158 on the body 154. The rollers have reduced ends 159 provided with annular grooves 160, in which coil springs 161 are placed. Corresponding annular grooves are also provided in the body 154. The springs act to hold the rollers in engagement with an expanding member 162 and also act to prevent the rollers from falling out of the body 154 through the circumference thereof.

Placed inside of the central bore of the body 154 is the cylindrical expanding member 162, which is slightly tapered, as shown in Figure 7, and is attached to a carrier rod 163 by a bolt 164. The carrier rod 163 extends through the body 165 of the head. The body 165 carries a sleeve 166 which surrounds the reduced portion 156 of the body 154. The carrier rod 163 is provided with a notch 167 into which a pin 168 enters for a purpose which will appear presently. The pin 168 is placed in an opening in the body 165 and is surrounded by a spring 169 normally held under compression between a shoulder on the pin 168 and the end of a bushing 170 screwed into the body 165 and through which bushing the pin 168 projects. Surrounding the carrier rod 163 is a compression spring 171, one end of which bears against one end of the member 162 and the other end of which bears against the body 165. The spring 171 therefore tends to push the member 162 to the right as viewed in Figure 7.

Surrounding the spring 171 is a compression spring 172, one end of which bears against the end of the reduced portion 156 of the body 154 and the other end of which spring bears against the body 165. The spring 172, therefore, tends at all times to force the body 154 to the right, as viewed in Figure 7. The sleeve 166 is provided with a set screw 173, the inner end of which enters a slot 174 in the reduced portion 156 of the body 154. The pin 173 therefore limits the relative longitudinal movement between the body 154 and the sleeve 166.

The carrier rod 163 has a reduced threaded portion 175 on the end thereof which extends outwardly through an opening in the body member 165. A knurled nut 176 is screwed onto the portion 175 and bears against the end of the body 165. The nut 176 therefore limits the movement of the carrier rod and the member 162 to the right, as shown in Figure 7. A second nut 177 is screwed onto the portion 175 and acts as a lock nut for the nut 176.

The pipe is rotating and as will be noted by reference to Figures 1 and 4 the rollers 157 are placed in the member 154 at a slight angle to the axis of said member. At this point in the operation it is desirable that the pin 168 be removed from the notch 167 to enable the member 162 to expand the rollers. This operation is accomplished by the following means:—

A pin 186 extends through the shaft 99 and engages at one end with a member 187 fastened to the guides 92. A lever 188 is pivoted at 189 to a projection 190 on the hub 97. The pin 186 is pivotally connected at 191 with the lever 188. The other end of the lever 188 is rounded as shown in Figure 10 and extends into a slot 192 in the pin 168. As the carriage moves over the guide-ways the pin 186 engages a cam surface 193 on the member 187 and is forced upwardly. The upward movement of the pin 186 causes an upward movement of the pin 168 and releases the same from the notch 167 in the carrier rod 163.

Upon the removal of the pin 168 the spring 171 pushes the tapered member 162 to the right as viewed in Figure 7, thus moving the rollers outwardly radially to increase the pressure of the rollers against the interior of the pipe. Due to the rotation of the pipe and the angular position of the rollers 157 to the axis of the pipe, the rollers gradually draw the head into the pipe to the position shown in Figure 7. This action has the effect of rounding the pipe.

The telescopic arrangement of the sleeve 166 on the reduced portion 156 of the body 154 permits a limited amount of flexibility in the head which is useful at the point in the operation when the head is entering the end of the pipe. The parts as shown in Figure 7 are in the position which they assume at the end of the rounding and chamfering operation.

The expanding member 162 is reset as follows:—

The carrier rod 163 is provided with a pin 178, as shown in Figure 7. This pin is for the purpose of moving the carrier rod 163 to the left, as viewed in Figure 7, so that the pin 168 will enter the notch 167 and hold the carrier rod 163 in retracted position. The means for actuating the pin 168 will now be described.

A projection 179 of the shape shown in Figure 9, is placed upon some fixed part of the machine. Mounted on one of the arms 96 of the head is a lever 180, pivoted at 181 on a bolt 182, as shown in Figures 9 and 10. One end of the lever 180 is provided with an elongated slot 183 through which the pin 178 extends, as shown in Figures 9 and 10. The other end of the lever 180 is provided with a finger 184 mounted to slide longitudinally in the end of the lever and held in the position shown in Figure 9 by a spring 185. When the head 95 is moved from the position shown in Figures 1 and 2 to that shown in Figure 4, the arms 96, together with the lever 180, move around the shaft 99 as a center. This movement is in a clockwise direction with respect to the parts, as shown in Figure 9, and the finger 184 is moved to the position shown in Figure 9, and in its course of movement strikes the rounded surface of the projection 179 and is pushed upwardly and snaps over the projection 179. After the rounding and chamfering operations have been completed, the carriage is moved back and the head is rotated from the position shown in Figure 4 to that shown in Figures 1 and 2, and during this operation the finger 184 engages the flat surface of the projection 179 and the lever 180 is caused to rotate about the bolt 182, whereupon the pin 178 is moved so that the pin 168 enters the slot 167 and holds the same until the pin 168 is removed therefrom.

The head 95 is provided with chamfering tools 194 and 195 as shown in Figure 4. The tool 194 chamfers the outside of the pipe and the tool 195 chamfers the inside so that the outer end of the pipe takes the form shown in Figure 7.

The chamfering tools 194 and 195 are carried on the head by holders 196 and 197, respectively, and are moved into engagement with the pipe by the cam 89. This movement of the chamfering tools is permitted by the telescopic arrangement of the parts 156 and 166.

After the pipe has been rounded and chamfered the cam slot in the cam 89 moves the lever 108 in a counterclockwise direction as viewed in Figures 2 and 10. This operation withdraws the carriage along the guideways and removes the head from the pipe. It is noted that the bolt 142 locks the carriage and the rack 103 together. These parts remain in locked relation until the roller 144 rides up the cam surface of the member 146 sufficiently to remove the bolt 142 from the slot 141 in the rack. During the first part of the reverse movement of the carriage the pin 186 passes off of the cam 193 so as to permit the resetting of the pin 168 in the notch 167 of the member 163 as already explained. After the locking bolt 142 is withdrawn from the rack, there will be a relative movement between the rack and the carriage which will rotate the head 95 from the position shown in Figure 4 to the position shown in Figures 1 and 2.

The foregoing completes the operation of the machine up to and including the rounding and chamfering operations and also the movement of the parts to their initial position.

We will now describe the operation of unclamping the pipe.

Between the gear 84 and the shaft 83 is placed a speed reducer 198 of any well known construction. This speed reducer reduces the speed 40 or 50 to one or any other desired ratio. The speed of the shaft 83 is so reduced that one revolution of the clutch member 82 constitutes a cycle of that part of the machine which operates upon the pipe. That is to say, a complete cycle of the whole machine, with the exception of the clamping and unclamping of the pipe.

After the shaft 83 has made a complete revolution and the part 86 of the member 85 has been moved to the position shown in Figure 14, the counterweight 72, shown in Figures 14 and 15, will rock the shaft 70 and through the member 74 and link 75 will act to disengage the clutch member 80 from the member 82. Mounted on the member 74, as shown in Figure 15, is a finger 200, pivoted at 201 and held against rotation in one direction by an adjustable screw 202. The finger 200 when it is moved to the right as viewed in Figure 15 by the counterweight 72, engages the member 203, which opens the motor switch 227 and moves the reversing switch 228 to the right, as viewed in Figure 18.

The switch 227 is held open by the counter electromotive force coil 229 and the reversing switch 228 is held to the right by the coil 230. As the motor comes to rest the coil 226 drops its armature and closes the circuit of the brake coil 53. The brakes are therefore applied and the drum 20 is held against rotation. When the motor stops, the switch 227 will be closed by the spring 231. The coil 230 holds the reversing switch to the right so as to reverse the rotation of the motor. As the motor rotates in the reverse direction the gear 18 rotates the pinions 31 which in turn remove the clamping jaws 34 from the pipe and unclamp the same.

During the reverse movement of the shaft 83 by reason of the reversal of the motor, a member 204 which is loosely mounted on the shaft 83 is rotated in a counterclockwise direction, as viewed in Figure 16, by the engagement of a pawl 205 thereon with a ratchet wheel 206 rigidly mounted on the shaft 83. The movement of the member 204 is transmitted through a link 207 to a member 208 pivoted at 209 and having on one end thereof a counterweight 210. The lever 208 carries a finger 211 which is pivoted at 212 and held against rotation in one direction by an adjustable screw 213. The finger 211 in its movement engages an operating finger 214 of the switch 215, supported by a bracket 219 attached to the base 1 of the machine. Upon the operation of the finger 214 the circuit of a coil 216 shown in Figure 18 is opened, whereupon the main line switch 217 is opened by a spring 218 and the motor and all other electrical parts of the machine are disconnected and the machine stops.

Referring to Figure 18, it will be noted that the circuits of the motor and brake are shown diagrammatically. These parts are supplied by current from the line 220 and the switch 217 is held closed by the coil 216 which is connected on the inside of the switch 217. The switch 217 connects the wires 221 to the reversing switch 228. A wire 222 leads from one of the wires 221 through the switch 63 which controls the circuit through the brake coil 53 and a wire 223 connects the other side of the coil 53 to the other wire 221. The arrangement of the switch 217 is such that it must be closed manually. After the switch is closed the coil 216 will hold it closed as long as that coil is energized. Normally, the switch 215 is held closed by a spring 224 and the reversing switch 228 is held in the position to run the motor in the forward direction by a spring 225. The switch 63 is held closed by gravity when the motor is at rest. A counter electromotive relay coil 226 is connected across the motor armature and acts to hold the switch 63 open as long as the speed of the motor is sufficient to energize the coil. This coil will hold the switch open after the same has been opened but will not act to open the switch.

Referring again to the device shown in Figure 16, the parts will assume the position shown in Figure 16 after the motor is again started and the shaft 83 is rotated about 30° in a clockwise direction. The counterweight 210 acts to cause the member 204 to follow the rotation of the ratchet wheel 206 until the counterweight strikes the base and stops. After the parts reach that point the pawl 205 merely clicks over the teeth of the ratchet wheel 206. During this movement of the parts, the finger 211 passes the member 214, and is rotated around the pivot 212 sufficiently to permit the finger 211 to pass under the end of the member 214.

During that part of the movement of the brake drum 39, wherein the shoe 54 acts through the various connections heretofore described, to engage the clutch member 80 with the member 82, it will be noted that the brakes are applied and as a result of which a considerable friction exists between the shoe 54 and the brake drum. This friction is sufficient to raise the counterweight 72 and also to force the clutch member 80 into engagement with the member 82, and hold it in engagement with the member 82 until the cam 87 or shaft 81 is rotated sufficiently to allow the projection 86 to enter the slot 79. As soon as this operation is completed, the brakes are released and the shoe 54 no longer contacts with the brake drum. By reason of the slotted connection between the extension 55 and the member 68, the shoe 54 may take the position shown in Figure 3 of the drawings.

The counterweight is held in its elevated position because the clutch members are held in engagement by the member 86. As soon, however, as the shaft 81 has made a complete revolution and the part 86 has been moved to the position shown in Figure 14, the clutch is no longer positively held in engagement by the projection 86 and the counterweight therefore becomes effective to disengage the clutch and operate the reversing switch 228, as hereinbefore explained.

We will now briefly describe the main features of the operation of my machine. The pipe to be operated upon is placed in the holder 20, and the switch 217 is closed manually. This energizes the motor and starts the same, and also energizes the brake coil 53 which applies the brakes to the brake drum 39 and holds the pipe holder 20 against rotation. The motor causes the gear 18 to rotate, thus actuating the pinions 31 which move the clamping jaws 34 into engagement with the pipe. As soon as the clamping jaws 34 have moved into engagement with the pipe and sufficient pressure has been created between the jaws and the pipe to stop the rotation of the pinions 31, the holder 20 will be rotated notwithstanding the fact that the brakes are applied at that time, that is to say, the brake drum will rotate in the brake shoes. This rotation will cause the brake shoe 54 to move in a clockwise direction as viewed in Figure 3, whereby the link 68 will be moved upwardly and the clutch member 80 moved into engagement with the clutch member 82 through the link 74 and other connecting members. At the end of the movement of the shoe 54 the circuit of the brake magnet 53 will be opened at the switch 63 and will be held open by coil 226. This will deenergize the magnet 53 and release the brakes, whereupon the pipe and pipe holder will rotate freely. The coil 226 will become effective to hold the switch 63 open and the shoe 54 will take the position shown in Figure 3 by reason of the slot connection between extension 55 and member 68. Upon the closing of the clutch, the shaft 81 will begin to rotate and cause the cams 89 and 111 to rotate. The rotation of these cams through the parts already described will cause the cutting tools to cut off the pipe and also cause the head 95 to move from the position shown in Figures 1 and 2 to that shown in Figure 4 and cause the head to enter the end of the pipe. At the proper point in the operation, as already explained, the pin 168 will be removed from the notch 167 and the rollers 157 will be expanded and drawn into the pipe to round out the same, finally assuming the position shown in Figure 7.

During the movement of the head into the pipe the chamfering tools 194 and 195 engage the outside and the inside of the pipe, respectively, and chamfer the same. As soon as the rounding and chamfering operations have been completed, that is to say, as soon as the cam member 89 has rotated to a predetermined point, the head is removed from the pipe and ultimately rotated to the position shown in Figures 1 and 2 and at that time the clutch members 80 and 82 are in condition to be separated and the counterweight 72 becomes effective to separate these clutch members and disconnect the shaft 81 from the shaft 83, whereupon those parts of the machine actuated through the clutch members 80 and 82 come to rest.

As soon as the counterweight 72 becomes effective to disengage the clutch members 80 and 82, it also actuates the reversing switch 228 by the arrangement shown in detail in Figure 15, to reverse the direction of rotation of the driving motor. At this time the magnet 53 becomes again energized and applies the brakes to the drum 39, thus stopping the pipe holder 20. The motor having been reversed and the brakes applied to the pipe holder, the gear 18 is rotated in a direction to unclamp the pipe. The unclamping of the pipe is accomplished by the pinions 31 moving the clamping jaws away from the pipe. During the reverse rotation of the shaft 83, the main switch 217 is opened by the mechanism shown in detail in Figure 16 as already explained. As soon as the coil 216 is deenergized by the opening of the switch 215, the main switch 217 is automatically opened by the spring 218, thus deenergizing the motor and the coil 53, whereupon the machine comes to rest.

From the foregoing it will be seen that means are provided for automatically operating upon the pipe, that is to say, cutting off the pipe, rounding it, chamfering it or performing other operations, and for unclamping the pipe after such operations have been completed.

Our invention has many advantages resulting from the automatic features involved; by reason of these automatic features the sequence of the various operations throughout the cycle is automatically controlled and the operations therefore follow each other rapidly and as a result of which the machine handles a large volume of material; labor is reduced to a minimum in that one operator is sufficient to operate the machine in carrying out all of the necessary operations; by reason of the arrangement disclosed, a machine is provided which occupies a minimum space for carrying out the various operations. Many other advantages will be apparent to those skilled in the art.

While we have shown and described the details of a machine embodying our invention, we desire it to be understood that many changes may be made in the mechanical details and arrangements of parts without departing from the spirit of our invention.

We claim:

1. A pipe machine including an element rotatable in one direction for clamping and turning a piece of pipe and rotatable in the opposite direction for releasing the piece of pipe clamped therein, pipe cutting means movable into operable position when said element is rotating in pipe turning position, means for driving said element in reverse directions, and means controlled by the pipe clamping element for moving the cutting means into cutting position when said element is clamping and rotating the pipe, substantially as described.

2. In a pipe machine, the combination of means for holding the pipe, means for cutting the pipe, and means controlled by the action of the holding means for effecting a relative movement between the pipe and the cutting means, substantially as described.

3. In a pipe machine, the combination of a rotatable holder for the pipe, means for holding the pipe holder against rotation, means for clamping the pipe in the holder, and means whose operation is dependent on the clamping action of said clamping means for releasing said holder to permit its free rotation, substantially as described.

4. In a pipe machine, the combination of a holder for the pipe, means for clamping the pipe in the holder, a tool for operating on the pipe and means whose operation is dependent upon the clamping action of the clamping means for causing a relative movement between the pipe and the tool, substantially as described.

5. In a pipe machine, the combination of a rotatable holder for the pipe, means holding the pipe against rotation, means for clamping the pipe in the holder, and means whose operation is dependent upon the clamping action of the clamping means for permitting the rotation of the pipe, substantially as described.

6. In a pipe machine, the combination of a holder for the pipe, means holding the holder against rotation, means for clamping the pipe in the holder, means actuating the clamping means, and means whose action is dependent upon the clamping means for releasing said holding means, substantially as described.

7. In a pipe machine, the combination of means for clamping the pipe, a plurality of tools operable in sequence upon the pipe, and means controlled by the clamping means for actuating said tools in sequence, substantially as described.

8. In a pipe machine, the combination of clamping means for the pipe, means for cutting off said pipe and means controlled by the clamping means for actuating said cutting means, substantially as described.

9. In a pipe machine, the combination of clamping means for the pipe, means for cutting off the pipe, means for rounding out the end of said pipe, and means controlled by the clamping means for actuating said cutting off and rounding means, substantially as described.

10. In a pipe machine, the combination of clamping means for the pipe, means for cutting off the pipe, means for chamfering said pipe and means controlled by said cutting off and clamping means for actuating said chamfering means, substantially as described.

11. In a pipe machine, the combination of clamping means for the pipe, means for cutting the pipe, a clutch through which the cutting means are actuated, and means controlled by the clamping action of the clamping means for actuating said clutch to render the cutting means effective, substantially as described.

12. In a pipe machine, the combination of means for clamping the pipe, means for cutting off the pipe, means for rounding the end of the pipe, a clutch through which the cutting off and rounding means are actuated and means controlled by the clamping action of the clamping means for actuating the clutch to render the rounding means effective, substantially as described.

13. In a pipe machine, the combination of means for clamping the pipe, means for cutting the pipe, means for rounding and chamfering the pipe, and means controlled by the clamping means for rendering the cutting means and the rounding and chamfering means effective, substantially as described.

14. In a pipe machine, the combination of a holder for the pipe, means for clamping the pipe in the holder, means preventing rotation of the holder during the clamping action, means for treating the pipe and means controlled by the action of said clamping means for rendering said pipe treating means effective, substantially as described.

15. In a pipe machine, the combination of means for holding the pipe, means for cutting the pipe, means controlled by the action of the holding means for effecting a relative movement between the pipe and the cutting means, and means for unclamping the pipe, substantially as described.

16. In a pipe machine, the combination of a rotatable holder for the pipe, means for holding the pipe holder against rotation, means for clamping the pipe in the holder, means whose operation is dependent upon the clamping action of said clamping means for releasing said holder to permit its free rotation, and means for unclamping the pipe, substantially as described.

17. In a pipe machine, the combination of a holder for the pipe, means for clamping the pipe in the holder, a tool for operating on the pipe and means whose operation is dependent upon the clamping action of the clamping means for causing a relative movement between the pipe and the tool, and means for unclamping the pipe, substantially as described.

18. In a pipe machine, the combination of a holder for the pipe, means for holding the holder against rotation, means for clamping the pipe in the holder, means actuating the clamping means, means whose action is dependent upon the clamping means for releasing said holding means, and means for unclamping the pipe, substantially as described.

19. In a pipe machine, the combination of a rotatable holder, radially acting clamping means movable into and out of clamping position, a gear loosely mounted on said holder and connected with said clamping means, a brake for holding said holder against rotation during clamping and releasing operations, reversible driving means for the gear, a manually operable switch for the brake, and means for releasing the brake when the holder offers a predetermined resistance thereto, substantially as subscribed.

20. In a pipe machine, the combination of clamping means for the pipe, means for cutting off said pipe, means controlled by the clamping means for actuating said cutting means, and means for unclamping the pipe, substantially as described.

21. In a pipe machine, the combination of clamping means for the pipe, means for cutting off the pipe, means for rounding out the end of said pipe, means controlled by the clamping means for actuating said cutting off and rounding means, and means for unclamping the pipe, substantially as described.

22. In a pipe machine, the combination of clamping means for the pipe, means for cutting off the pipe, means for chamfering said pipe, means controlled by said clamping means for actuating said chamfering means, and means for unclamping the pipe, substantially as described.

23. In a pipe machine, the combination of clamping means for the pipe, means for cutting the pipe, a clutch through which the cutting means are actuated, means controlled by the clamping action of the clamping means for actuating said clutch to render the cutting means effective, and means for unclamping the pipe, substantially as described.

24. In a pipe machine, the combination of means for clamping the pipe, means for cutting off the pipe, means for rounding the end of the pipe, a clutch through which the rounding means are actuated, means controlled by the clamping action of the clamping means for actuating the clutch to render the cutting off and rounding means effective, and means for unclamping the pipe, substantially as described.

25. In a pipe machine, the combination of means for clamping the pipe, means for cutting the pipe, means for rounding and chamfering the pipe, means controlled by the clamping means for rendering the cutting means and the rounding and chamfering means effective, and means for unclamping the pipe, substantially as described.

26. In a pipe machine, the combination of a holder for the pipe, means for clamping the pipe in the holder, means preventing rotation of the holder during the clamping action, means for treating the pipe, means controlled by the action of said clamping means for rendering said pipe treating means effective, and means for unclamping the pipe, substantially as described.

27. In a pipe machine, the combination of means for clamping the pipe, means for operating upon the pipe, means controlled by the action of the clamping means for rendering the pipe operating means effective, and means actuated upon the completion of the operations upon the pipe for unclamping the pipe, substantially as described.

28. In a pipe machine, the combination of means for automatically clamping the pipe, means for operating upon the pipe, means actuated upon the completion of the clamping action for automatically rendering said pipe operating means effective, and means actuated upon the completion of the operations on the pipe for automatically rendering the pipe operating means ineffective, substantially as described.

29. In a pipe machine, the combination of means for initially automatically clamping the pipe and thereafter rotating the pipe through said clamping means, and means for operating upon the pipe, and means for effecting the unclamping of the pipe, said operating means and means for unclamping the pipe being controlled in sequence by the operation of the pipe clamping and rotating means, substantially as described.

30. In a pipe machine, the combination of means for gripping and rotating a pipe, means for operating upon the pipe, connections between the gripping and rotating means and the operating means for rendering said operating means effective upon rotation of the pipe, and means for automatically unclamping the pipe, substantially as described.

31. In a pipe machine, the combination of a holder for the pipe, a brake for the holder, clamping means for the pipe, a gear on the holder and adapted to be rotated on the holder to actuate the clamping means and thereafter to rotate the holder and pipe, and means for releasing the brake after the pipe is clamped, substantially as described.

32. In a pipe machine, the combination of means for holding the pipe, means for rotating the pipe, means dependent upon the action of the clamping means for operating upon the pipe and means actuated at a predetermined time in the operation of the machine for stopping the operating means, substantially as described.

33. In a pipe machine, the combination of means for holding the pipe, means for rotating the pipe, a cam device whose action depends upon the action of said holding means, means controlled by said cam device for operating upon the pipe and means rendered effective upon a predetermined movement of said cam for stopping the operations upon the pipe, substantially as described.

34. In a pipe machine, the combination of means for holding the pipe, means for rotating the pipe, means dependent upon the action of the clamping means for operating upon the pipe, means actuated at a predetermined time in the operation of the machine for stopping the operating means, and means rendered operative upon the stopping of the operating means for unclamping the pipe, substantially as described.

35. In a pipe machine, the combination of means for holding the pipe, means for rotating the pipe, a cam device whose action depends upon the action of said holding means, means controlled by said cam device for operating upon the pipe, means rendered effective upon a predetermined movement of said cam for stopping the operations upon the pipe, and means rendered operative upon the stopping of the operating means for unclamping the pipe, substantially as described.

36. In a pipe machine, a pipe holder, clamping means mounted on said holder and adapted to be moved radially, a gear mounted on said holder and operatively connected to said clamping means and means driving said gear to clamp the pipe and to rotate the holder upon the completion of the clamping action, substantially as described.

37. In a pipe machine, the combination of clamping means for the pipe, pipe working tools, and means controlled by the clamping means for actuating said tools, substantially as described.

38. In a pipe machine, the combination of clamping means for the pipe, tools for working on said pipe, means controlled by the clamping means for actuating said tools, and means for unclamping the pipe upon the conclusion of such operation, substantially as described.

In testimony whereof we have hereunto set our hands.

GEORGE E. MIRFIELD.
WILLIAM M. NECKERMAN.

means and the operating means for rendering said operating means effective upon rotation of the pipe, and means for automatically unclamping the pipe, substantially as described.

31. In a pipe machine, the combination of a holder for the pipe, a brake for the holder, clamping means for the pipe, a gear on the holder and adapted to be rotated on the holder to actuate the clamping means and thereafter to rotate the holder and pipe, and means for releasing the brake after the pipe is clamped, substantially as described.

32. In a pipe machine, the combination of means for holding the pipe, means for rotating the pipe, means dependent upon the action of the clamping means for operating upon the pipe and means actuated at a predetermined time in the operation of the machine for stopping the operating means, substantially as described.

33. In a pipe machine, the combination of means for holding the pipe, means for rotating the pipe, a cam device whose action depends upon the action of said holding means, means controlled by said cam device for operating upon the pipe and means rendered effective upon a predetermined movement of said cam for stopping the operations upon the pipe, substantially as described.

34. In a pipe machine, the combination of means for holding the pipe, means for rotating the pipe, means dependent upon the action of the clamping means for operating upon the pipe, means actuated at a predetermined time in the operation of the machine for stopping the operating means, and means rendered operative upon the stopping of the operating means for unclamping the pipe, substantially as described.

35. In a pipe machine, the combination of means for holding the pipe, means for rotating the pipe, a cam device whose action depends upon the action of said holding means, means controlled by said cam device for operating upon the pipe, means rendered effective upon a predetermined movement of said cam for stopping the operations upon the pipe, and means rendered operative upon the stopping of the operating means for unclamping the pipe, substantially as described.

36. In a pipe machine, a pipe holder, clamping means mounted on said holder and adapted to be moved radially, a gear mounted on said holder and operatively connected to said clamping means and means driving said gear to clamp the pipe and to rotate the holder upon the completion of the clamping action, substantially as described.

37. In a pipe machine, the combination of clamping means for the pipe, pipe working tools, and means controlled by the clamping means for actuating said tools, substantially as described.

38. In a pipe machine, the combination of clamping means for the pipe, tools for working on said pipe, means controlled by the clamping means for actuating said tools, and means for unclamping the pipe upon the conclusion of such operation, substantially as described.

In testimony whereof we have hereunto set our hands.

GEORGE E. MIRFIELD.
WILLIAM M. NECKERMAN.

CERTIFICATE OF CORRECTION.

Patent No. 1,610,463.            granted December 14, 1926.

to GEORGE E. MIRFIELD ET AL.

It is hereby certified that error appears in the printed specification of the above mentioned patent requiring correction as follows: Page 9, line 60, claim 22, after the word "said" insert the words "cutting off and"; and that the said Letters Patent should be read with this correction therein that the same may conform to the record of the case in the Patent Office.

Signed and sealed this 15th day of February, A. D. 1927.

Seal.

William A. Kinnan,
Acting Commissioner of Patents.

CERTIFICATE OF CORRECTION.

Patent No. 1,610,463. granted December 14, 1926.

to GEORGE E. MIRFIELD ET AL.

It is hereby certified that error appears in the printed specification of the above mentioned patent requiring correction as follows: Page 9, line 60, claim 22, after the word "said" insert the words "cutting off and"; and that the said Letters Patent should be read with this correction therein that the same may conform to the record of the case in the Patent Office.
Signed and sealed this 15th day of February, A. D. 1927.

Seal.

William A. Kinnan,
Acting Commissioner of Patents.